Nov. 17, 1931.  J. B. FERGUSON  1,832,196
REFLECTING SIGN
Filed Sept. 12, 1928  5 Sheets-Sheet 1
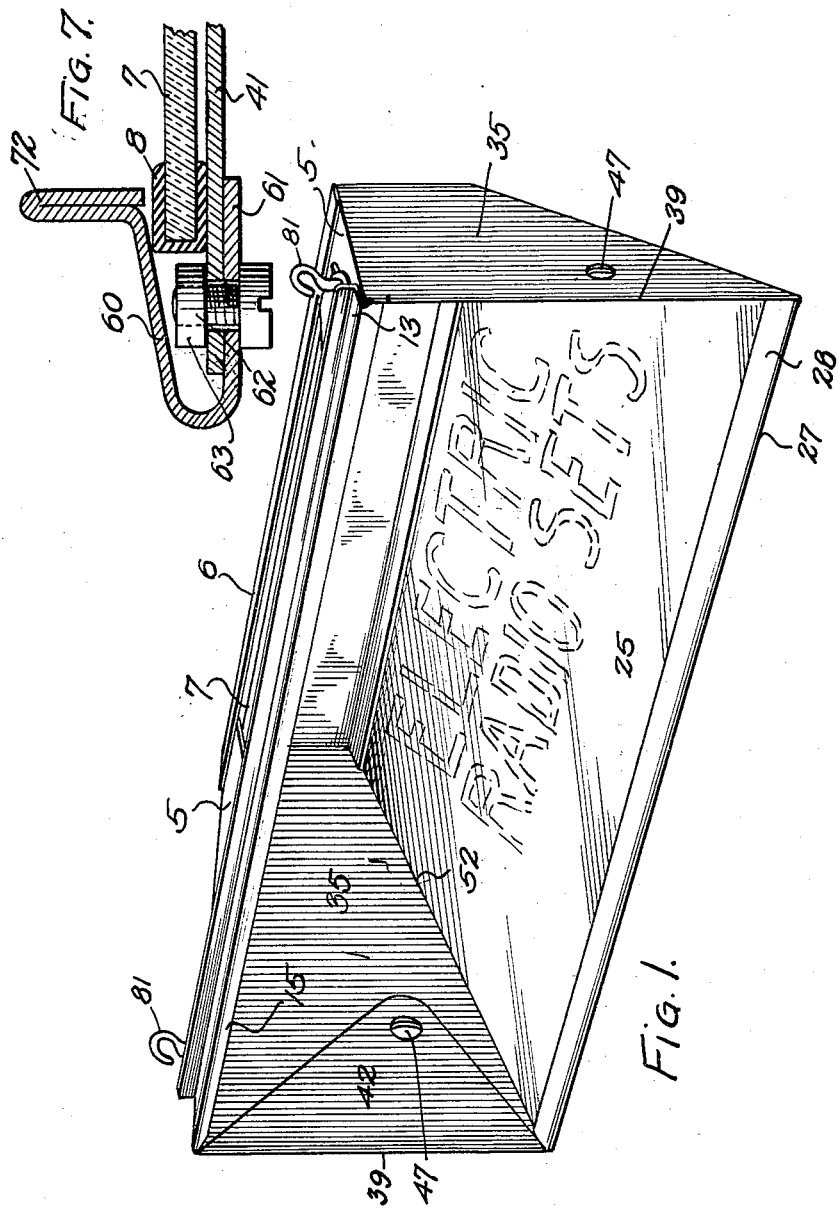
Inventor
Joseph B. Ferguson
By
Martin T. Fisher  Attorney

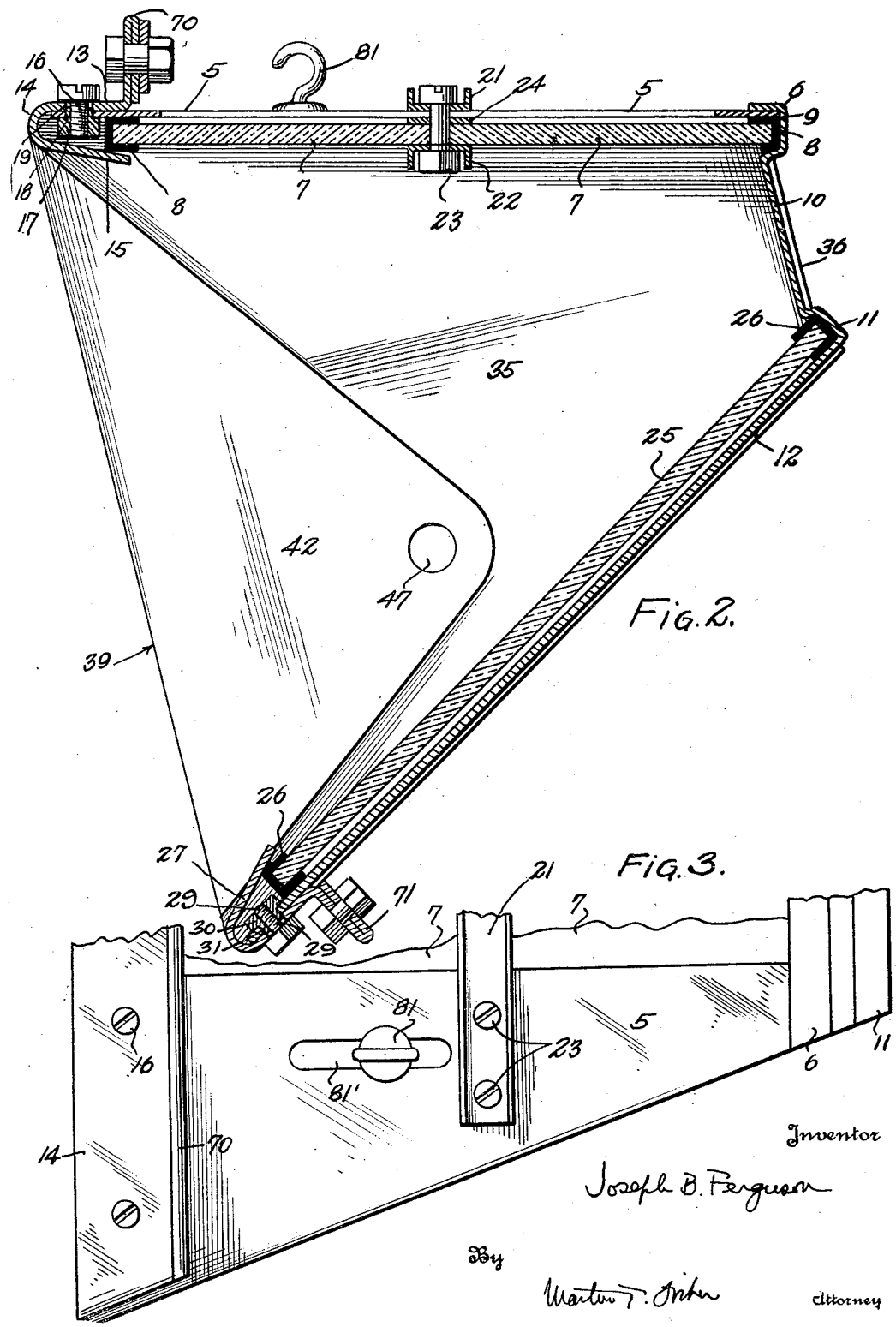

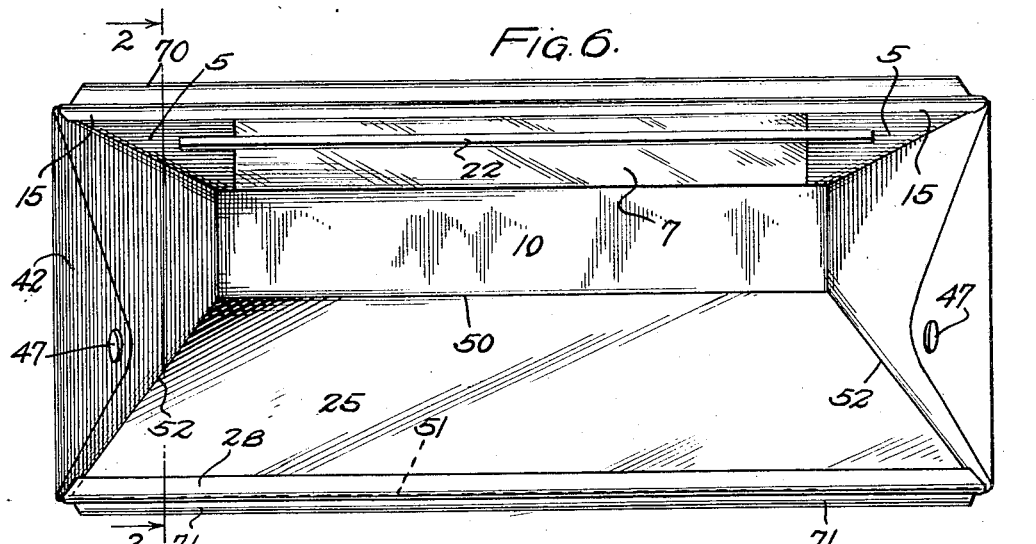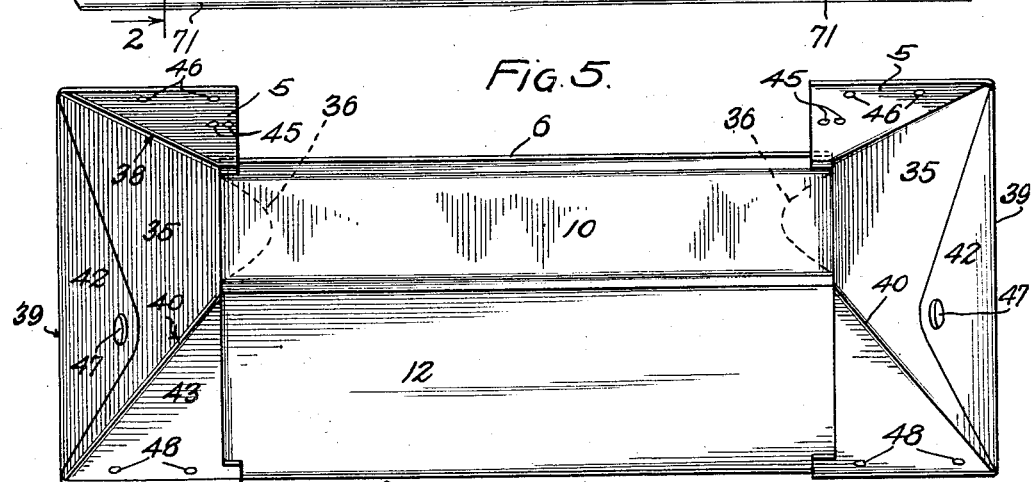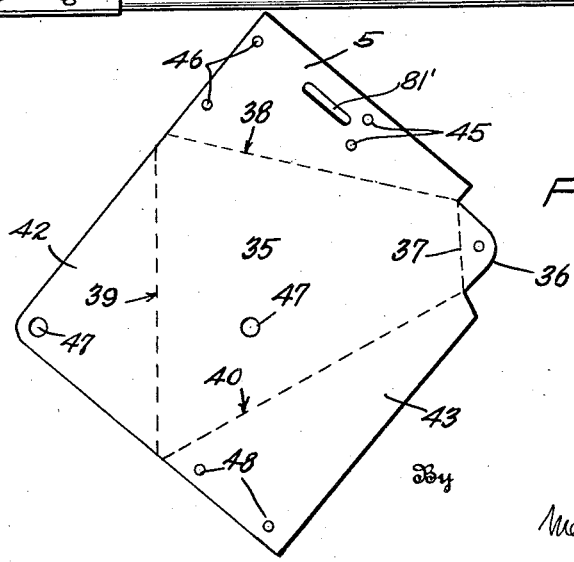

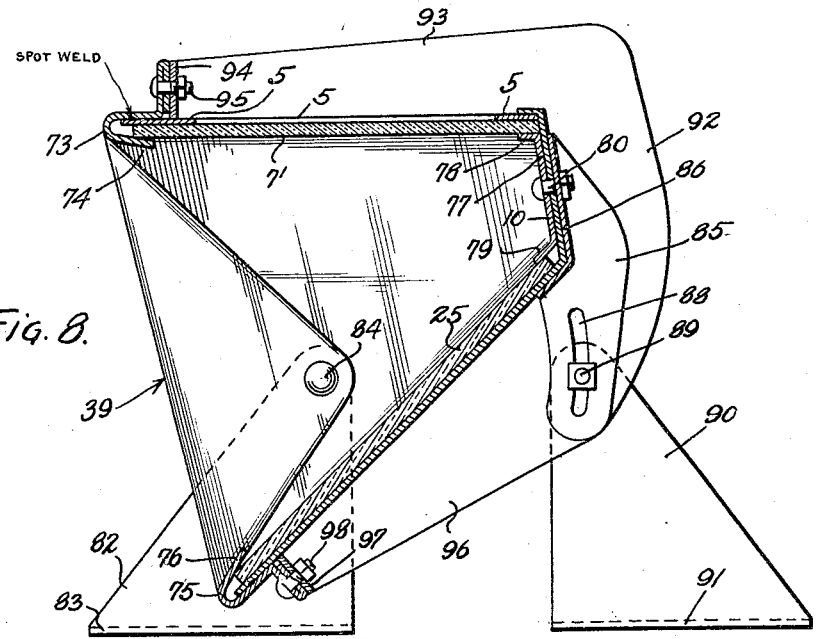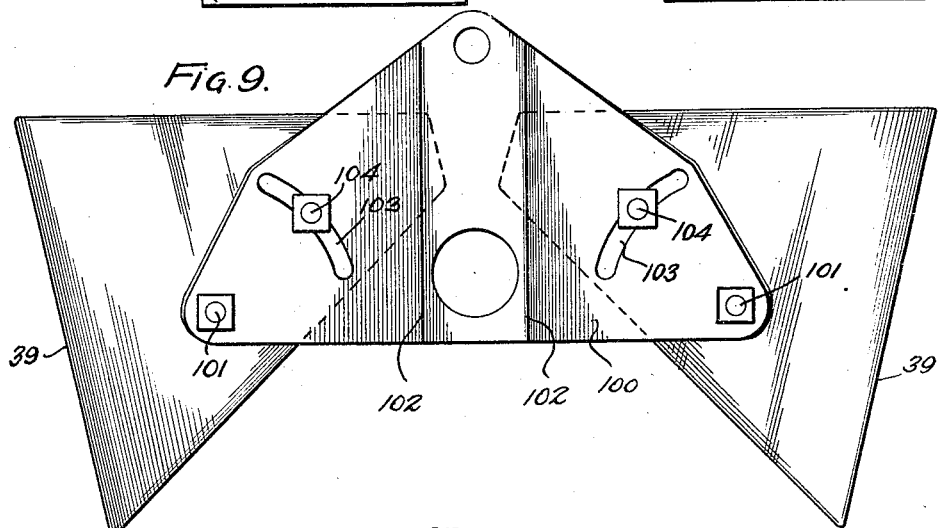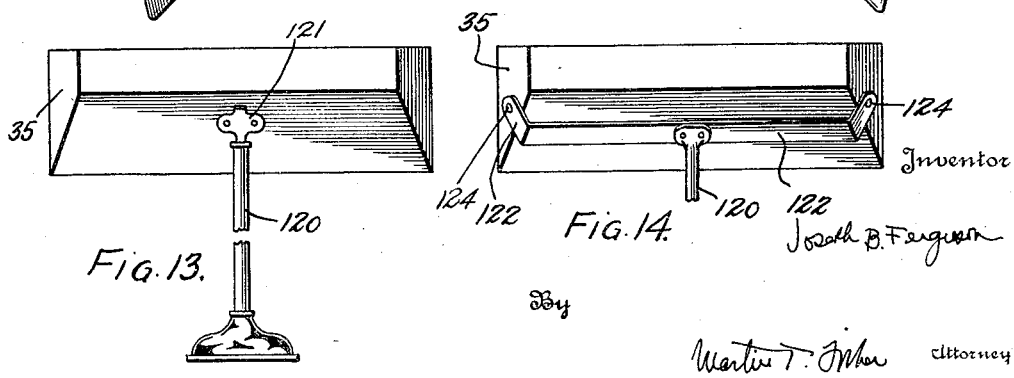

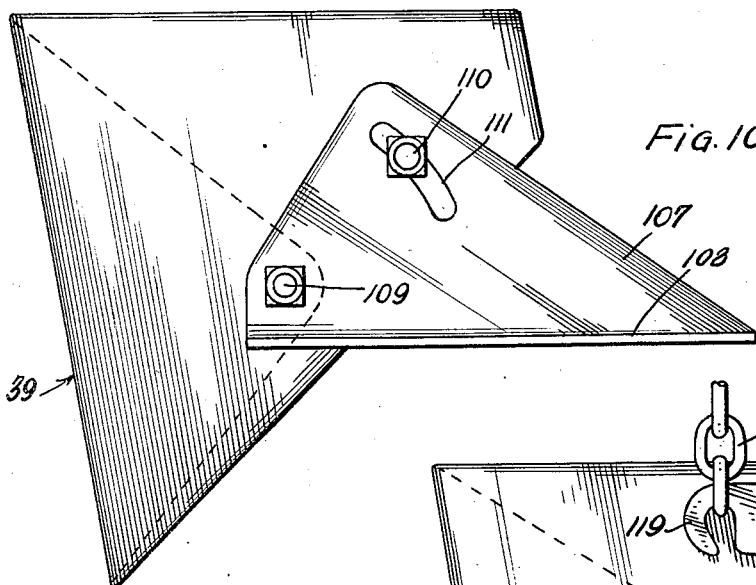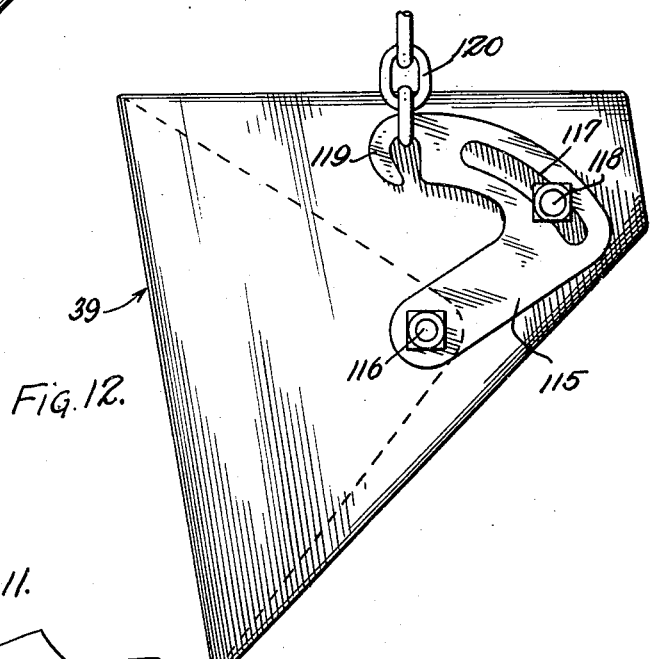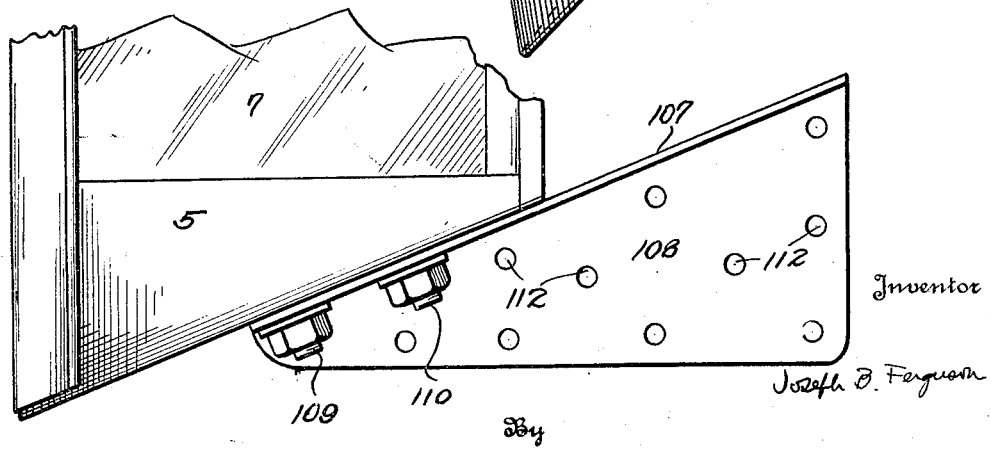

Patented Nov. 17, 1931

1,832,196

UNITED STATES PATENT OFFICE

JOSEPH B. FERGUSON, OF NEWARK, NEW JERSEY

REFLECTING SIGN

Application filed September 12, 1928. Serial No. 305,495.

This invention is an improvement in reflecting signs, of the type comprising two converging walls, one of which carries transparent or translucent letters, and the other of which supports a mirror for projecting the reflection of the letters. The wall that carries the translucent letters is positioned to be illuminated by natural or artificial light, the light being positioned on the opposite side of the letters with respect to the mirror, so that the image of the letters picked up by the mirror shows the letters illuminated. The translucent letters are normally positioned in a substantially horizontal plane, so as to be illuminated by daylight or sunlight, while the mirror is positioned below these letters at an angle of about 45°. For convenience, the wall carrying the translucent letters will be called the top wall, because in most instances it is at the top of the sign, but in this description it should be understood to mean that wall carrying the letters.

With this type of sign, the end walls usually extend backwardly at a right angle to the plane of the front of the sign. The result of this is that when a spectator is standing to one side of the sign his view of the end letters of the sign is cut off, the number of letters that are cut off being of course dependent upon where he is standing. In order to improve the visibility of the sign to spectators at one side, the sign of this invention is provided with end walls which flare outwardly or laterally. This flare is in addition to the usual vertical flare between the top wall and the mirror.

This invention also contemplates a number of structural details, which will now be pointed out.

The end walls of the sign are formed from a blank which is approximately four-sided, three of the sides being bent inwardly and secured respectively to the top wall, the back wall and the inclined mirror carrying wall, while the fourth side of the blank is reversely bent back on itself for strengthening the end wall and for providing a rounded vertical front edge for the end wall. Other improved structural features are a detachable setting both for the mirror and for the glass carrying the translucent letters, so that either may be replaced as necessary.

In larger signs, it may be desirable to have the glass carrying the translucent letters made in two or more strips or sections, a feature which is especially desirable if the letters in one section are in one color and in another section of another color, or in case it is desirable from day to day to change the color of one or both strips. This invention provides channeled means for detachably holding the strips of glass in position.

Signs of this nature, which are used primarily for advertising purposes, are mounted in many different places; they are mounted on the tops of automobile trucks and delivery wagons, in store windows, on walls, on counters in a store, or suspended over doorways, etc. According to this invention, various improved ways are disclosed for mounting the sign in these various positions, and for setting the sign at the proper angles.

The improvements discussed above, and other structural details forming part of the invention, are disclosed further in the accompanying drawings, illustrating the preferred ways for carrying out the invention.

In these drawings, Figure 1 is a perspective view of my improved sign;

Figure 2 is a section through the sign, on line 2—2 of Fig. 6;

Figure 3 is a top view of one end of the sign;

Figure 4 shows a blank from which one of the end walls is formed;

Figure 5 is a front view of the skeleton of the sign;

Figure 6 is a front view of the sign;

Figure 7 is a section showing a modified way of constructing the front edge;

Figure 8 shows a modification of the sign, and shows means for mounting the sign;

Figure 9 shows another way of mounting the sign;

Figures 10, 11, 12, 13 and 14 show different types of brackets for mounting the sign.

Referring now to these drawings, in which similar characters indicate similar parts, the top wall of the sign is formed by end plates 5, and a longitudinally extending backstrip 6, defining a large central opening in which is mounted one or more glass strips 7 which, according to the usual practice, are made of colored glass, painted with a background of dark enamel or paint, thus bringing out the letters in colored glass. The edges of the glass strips may be protected by U-shaped strips 8 of rubber or the like. The longitudinally extending strip 6 merges into the vertically extending plate 9, Fig. 2, which in turn is continued to form the back wall 10, which at its lower edge is bent at 11 and thence merges into the inclined back plate 12, the parts 6, 9, 10, 11 and 12 preferably being made from a single sheet of metal. The rear edge of the glass 7 is mounted in the groove formed by the parts 6 and 9.

The front edge of the front glass 7 is detachably mounted in the front edge of the sign; this mounting comprises a longitudinally extending member 13 which is bent at 14 and terminates in a tongue 15 which is bent around and engages with the edge of the glass.

The front edge just described is secured to the top plate 5 by a readily detachable mounting which comprises a threaded bolt 16 which engages with a nut 17 which is of special shape being provided with an annular collar 18 which fits in the hole 19 in the plate 5. The nut is preferably brazed or soldered in place. When the bolt is loosened, and removed, the front edge may be removed, the nut 17 meanwhile retaining its position in registry with the hole.

The adjacent edges of the glasses 7 are mounted between upper and lower longitudinally extending U-shaped strips 21 and 22 which are provided with registering holes for a bolt 23. Between the plate 5 and the upper edges of the glasses there may be a plate or washer 24.

It will be evident that by removing the bolts 23 and 16 either or both glasses are readily removable.

The back wall 10 is bent as mentioned, at 11, to form a groove or holding for the upper edge of a mirror 25, the upper and lower edges of which may be protected by U-shaped strips 26 of rubber, felt or the like. The mirror is supported at an angle of about 45° with relation to the glasses 7. The lower front edge of the mirror is detachably secured to the sign by a detachable strip 27 which is bent around as at 28 to engage the front edge of the back plate 12 and is secured thereto by the bolt 29 and nut 30, the nut 30 having a collar 31 projecting into a suitable hole in the plate 12, this collar 31 keeping the nut in position when the bolt is removed. The nut is preferably brazed or soldered in place.

The end walls of the sign taper from front to rear as shown in Fig. 2, and are positioned in the sign so that they converge toward each other from front to rear as shown in Figs. 5 and 6, the tapering from front to rear giving a vertical flare to the sign while the convergence of the end walls gives a lateral flare.

The end walls are made from a substantially four-sided blank, as shown in Figure 4. This blank, the central part of which is shown at 35, is cut away at one corner so as to form a projecting tab 36, defined by the line 37. Dotted lines 38, 39 and 40, which are lines of fold, define tabs 5, 42 and 43. The tab 36 is bent inwardly at an obtuse angle and is secured to the back wall 10 of the sign by brazing or spot welding. The tab 5 is bent downwardly to form the end portions 5 of the top wall of the sign as shown in Figure 5. The tab 5 is provided with holes 45 for the passage of the bolts 23 and with holes 46 for the bolts 16.

The tab 42 is reversely bent 180° along the line 39, the line of bend forming a rounded vertical front edge 39. The center part of the blank and the tab 42 are provided with holes 47 which register after the described bending has taken place, forming a hole 47 for use in attaching a securing bracket.

The tab 43 of the blank is provided with holes 48 for the reception of the bolts 29.

Figure 5 shows the sheet metal frame of the sign, with the mirror 25 and the upper front strip 70 and the lower front strip 28 removed. Figure 6 shows the mirror and front strips assembled in place in the metal frame.

As shown in Figure 6, the mirror 25 is substantially the shape of an isosceles trapezoid, the parallel edges of which are shown at 50 and 51, and the equal legs of which are shown at 52.

A modified way of holding the glasses 7 or the mirror 25 in place is shown in Figure 7. A retaining strip 60 is bent around, as at 61, the front edge of part 41 of the top wall, and is secured to that wall by a bolt 62 which engages in a collar 63 which is brazed or soldered to the wall 41. The purpose of the collar is to furnish a thread for the bolt. The bolts 16 and 29, previously described, may engage in similar collars, if desired.

Fig. 8 shows modified ways of securing the glass and mirror in place. In this modification, the front strip 73 is bent around as at 74 for holding the front edge of the lettered glass 7′. The front edge of the top wall 5, instead of being detachably secured to the front strip, as in the other figures, is permanently secured by spot welding or brazing.

The lower front edge of the mirror 25 is similarly held, the front strip 75 having a strip 76 furnishing a socket for holding the front edge of the mirror. The glass 7′ and the mirror 25 are mounted by first putting their front edges in place as in Fig. 8, and then clamping their respective rear edges in place, by means of a detachable back plate 77 having a flange 78 for engaging the rear edge of the glass 7′ and having a second flange 79 for engaging the rear upper edge of the mirror 25. The back plate 77 is detachably secured to the back wall 10 of the sign by bolt 80.

Referring to Fig. 2, the upper front retaining strip 13 has a stiffening rib 70; the lower front retaining strip 28 has a stiffening rib 71 and the strip 60 of Fig. 7 has a stiffening rib 72, these ribs being formed of metal reversely bent, for giving a longitudinal stiffening to the sign.

The various ways of mounting the sign will now be described. Referring first to Fig. 2, the top wall of the sign may be provided with hooks 81, whereby the sign may be suspended by chains attached to these hooks. The top wall 5 may have slots 81′ for mounting these hooks, see Fig. 4.

Referring to Fig. 8, the sign may also be mounted in a pair of end vertical brackets 82 having a base 83 secured to a suitable support, a bolt 84 passing through a hole in the upper part of the bracket 82 and through the holes 47 in the end walls of the bracket securing the sign to the bracket. Supplementary brackets may be used, as will now be described.

In case the sign is long and heavy it may need a support in the middle. For this purpose one or more brackets 85 are provided which may be at opposite ends of the sign, or at one or more intermediate points, as desired. The bracket 85 has a flange portion 86 secured to the back wall 10 of the sign by bolts 80. The bracket 85 is provided with an arcuate slot 88, taking over a stud or bolt 89 mounted in the upper end of a vertical support 90, the foot 91 of which is suitably secured to a permanent base.

It is sometimes desirable to provide a three point support for the sign, so that it will yield to movements of the top of the vehicle, and not break the glass. Where, then, the sign is supported at two points at one end, as by bolts 84 and 89, one of the corresponding bolts at the other end may be omitted, thus providing a three-point support and giving additional flexibility to the sign. This three point support may be provided, if desired, in the other types of brackets described below.

For still longer signs, a substantially U-shaped supporting and stiffening bracket 92 may be provided, which may be integral with or secured to the bracket 85. The support or bracket 92 has an upper forward extension 93 terminating in a flange 94 secured by a bolt 95 to the front edge 73. The U-shaped bracket 92 has a lower forward extension 96 terminating in a flange 97 secured by a bolt 98 to the front edge 75 of the sign.

Referring to Fig. 9, a supporting means is there shown for mounting two signs in back to back relation on a common support. This common support comprises end plates 100 substantially triangular in shape, secured to the ends of the signs by bolts 101, passing through holes in the sign and bracket. The bolts 101 furnish pivot points for holding the signs in the bracket. The bracket is provided with arcuate slots 103 in which bolts 104 engage, these bolts being mounted in the holes 47 in the end wall of the sign.

The brackets 100 are bent along the lines 102, 102 to fit against the inwardly inclined end wall of the sign; wedge shaped fillers could also be used between the brackets 100 and the end of the sign to accommodate the angularity of the end of the sign.

The sign may also be mounted in a bracket of the type as shown in Fig. 10. This bracket comprises a vertical plate 107 and a base plate 108. A bolt 109 passes through the hole 47 in the end plate of the sign and through a hole in the bracket provides a pivot support. A second bolt 110 moving in an arcuate slot 111 in the bracket plate 107 provides an adjustable support whereby the sign may be positioned at any desired angle.

Referring to Fig. 11, which is a plan view of Fig. 10, the bracket base is provided with holes 112 for securing it to a suitable base.

In the modification shown in Fig. 12, a bracket 115 is secured to the end wall of the sign with a bolt 116. The bracket is provided with an arcuate slot 117 which takes over a bolt 118 carried by the end wall of the sign for giving an adjustable angular support for the sign. The bracket has a forwardly extending hook 119 furnishing a point of engagement for a chain 120 or the like for suspending the sign. Varying the setting of the bracket changes the angular setting of the sign.

The several described forms of brackets may be stamped out of sheet stock of standard, uniform width, at comparatively little expense.

The sign may also be supported as shown in Figs. 13 and 14. In Fig. 13 the sign is secured to a standard 120 which has an upper end 121 secured to the central back portion of the sign. In Fig. 14, the standard supports a horizontally extending bracket 122, the ends 123 of which are bent around the ends of the sign and secured to it by bolts at 124.

While I have illustrated my invention in considerable detail, it should be understood that the invention is not limited to the precise structures shown, but may be carried out in other ways as expressed within the scope of the claims.

I claim as my invention:—

1. In a reflecting sign, the combination of a top wall, a light-transmitting sign member carried thereby, a relatively inclined wall for supporting a mirror, and cooperating end walls which taper from front to rear, and which converge toward each other, and which are connected with the inclined wall, whereby the sign flares vertically and laterally, each of the end walls being formed from a blank, two corners of which are bent inwardly and form part of the top wall and inclined wall, respectively.

2. In a reflecting sign, the combination of a top wall, a light-transmitting sign member carried thereby, a relatively inclined wall for supporting a mirror, and cooperating end walls which taper from front to rear, and which converge toward each other, whereby the sign flares vertically and laterally, each of the end walls being formed from a blank, two corners of which are bent inwardly and form part of the top wall and inclined wall, respectively, while a third corner is reversely bent back onto the body of the blank, for forming a rounded vertical front edge, and for reenforcing the end wall.

3. In a reflecting sign, the combination of a top wall, a light-transmitting sign member carried thereby, a relatively inclined wall for supporting a mirror, a back wall, and cooperating end walls which taper from front to rear and which converge toward each other, whereby the sign flares vertically and laterally, each of the end walls being formed from a blank, three corners of which are bent inwardly and fastened to the top, back and inclined walls, respectively.

4. In a reflecting sign, the combination of a top wall, a light-transmitting sign member carried thereby, a relatively inclined wall for supporting a mirror, and cooperating end walls which taper from front to rear, and which converge toward each other, whereby the sign flares vertically and laterally, each of the end walls being formed from a blank, two corners of which are bent inwardly and form part of the top wall and inclined wall, respectively, while a third corner is reversely bent back onto the body of the blank, for forming a rounded vertical front edge, and for reenforcing the end wall, while a fourth corner is reversely bent back onto the body of the blank, for forming a reenforced end wall, and for forming a rounded vertical front edge for the end wall.

5. In a reflecting sign, the combination with relatively inclined top and bottom walls; end walls which converge toward the rear of the sign; a front strip for forming a front edge of the sign, the front strip serving to detachably hold one of the glass parts of the sign and being attached to the walls of the sign, the front strip being provided with a lengthwise stiffening rib for giving it longitudinal rigidity.

6. A reflecting sign comprising a horizontally disposed glass, carrying letters or symbols, a mirror at an angle below the glass, the sign having end walls which converge, and having on top at each end horizontally placed segments attached to the end walls and forming the top wall, these segments becoming narrower toward the rear of the sign.

7. A reflecting sign comprising a horizontally disposed glass, carrying letters or symbols, a mirror at an angle below the glass, the sign having end walls which converge, and having on top at each end horizontally placed segments forming a part of the top wall, these segments becoming narrower toward the rear of the sign, and a front glass retaining strip forming the top front edge of the sign and secured to the front edges of said horizontal segments.

8. A reflecting sign comprising a horizontally disposed glass, carrying letters or symbols, a mirror at an angle below the glass, the sign having end walls which converge, and having on top at each end horizontally placed segments forming a part of the top wall, these segments becoming narrower toward the rear of the sign, and a front glass retaining strip forming the top front edge of the sign and welded to the front edges of said horizontal segments.

9. A reflecting sign comprising a plurality of horizontally disposed glass strips carrying letters or symbols, a mirror at an angle below the glass, the sign having end walls which converge, and having on top at each end horizontally disposed segments forming a part of the top wall, and strip means engageable with the adjacent edges of the glass strips and secured to said horizontally disposed segments.

10. A reflecting sign comprising a plurality of horizontally disposed glass strips carrying letters or symbols, a mirror at an angle below the glass, the sign having end walls which converge, and having on top at each end horizontally disposed segments forming a part of the top wall, strip means engageable with the adjacent edges of the glass strips and secured to said horizontally disposed segments, and a front glass retaining strip forming the front edge of the sign and secured to the front edges of said horizontal segments.

11. A reflecting sign comprising a horizontally disposed glass, carrying letters or symbols, a mirror at an angle below the glass, a front glass retaining strip having a portion of itself bent to form a longitudinally extending stiffening rib, and means for detachably securing the glass retaining strip in place on the frame of the sign.

12. A reflecting sign comprising a horizontally disposed glass, carrying letters or symbols, a mirror at an angle below the glass, the sign having end walls which converge, and having on top at each end horizontally placed segments forming a part of the top wall, these segments becoming narrower toward the rear of the sign, and a front glass-retaining strip having a portion of itself reversely bent to form a longitudinally extending stiffening rib, and means for securing the glass-retaining strip to the front edges of said horizontally placed segments of the top wall.

13. A reflecting sign comprising a horizontally disposed glass, carrying letters or symbols, a mirror at an angle below the glass, the sign having end walls which converge, and having on top at each end horizontally placed segments forming a part of the top wall, these segments becoming narrower toward the rear of the sign, and bracket means secured to the converging end walls, adjacent the horizontal segments of the top wall.

14. A reflecting sign comprising a horizontally disposed glass, carrying letters or symbols, a mirror at an angle below the glass, the sign having end walls which converge, and having on top at each end horizontally placed segments forming a part of the top wall, these segments becoming narrower toward the rear of the sign, and a plate detachably secured to the rear of the sign and engageable with the rear edges of the glass and mirror, respectively, for holding them in place.

15. A reflecting sign comprising top, back and bottom walls, the back wall being provided with upper and lower horizontally extending grooves, horizontal and inclined glass elements associated with the top and bottom walls, respectively, having their respective rear edges held in said upper and lower grooves, and longitudinally extending strips for supporting the front edges of the glass members.

16. A reflecting sign comprising top, back, bottom and end walls, the end walls converging toward the rear of the sign, the top wall having horizontally disposed end segments narrowing toward the rear of the sign, the back wall having longitudinally extending upper and lower grooves, glass members having their respective rear edges supported in said upper and lower grooves, and longitudinally extending glass retaining strips detachably secured to the front edges of said end segments of the top wall, for holding the front edges of the glass members.

17. In combination, a pair of oppositely facing signs, each of which comprises a horizontal glass carrying letters or symbols, and a mirror at an angle beneath the glass, each sign having end walls, which converge, brackets engageable with adjacent end walls of the signs, means, cooperating with the brackets and end walls, for variably positioning the signs with respect to the brackets.

In witness whereof I hereunto affix my signature.

JOSEPH B. FERGUSON.